(12) United States Patent
Yang et al.

(10) Patent No.: US 6,652,152 B2
(45) Date of Patent: Nov. 25, 2003

(54) OPTICAL FIBER CONNECTOR

(75) Inventors: Jian Ning Yang, Kunsan (CN);
ZiQiang Zhu, Kunsan (CN); Qi Jun Zhao, Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/027,274

(22) Filed: Dec. 20, 2001

(65) Prior Publication Data

US 2003/0103732 A1 Jun. 5, 2003

(30) Foreign Application Priority Data

Nov. 30, 2001 (TW) .................................... 90220799 U

(51) Int. Cl.⁷ .................................................. G02B 6/36
(52) U.S. Cl. ........................................ 385/53; 385/139
(58) Field of Search ............................ 385/53, 60, 62, 385/78, 81, 72, 139

(56) References Cited

U.S. PATENT DOCUMENTS 6,041,155 A * 3/2000 Anderson et al. ........... 385/139
6,186,670 B1 * 2/2001 Austin et al. ................. 385/55
6,206,577 B1 * 3/2001 Hall, III et al. ............... 385/53

* cited by examiner

*Primary Examiner*—Phan T. H. Palmer
(74) *Attorney, Agent, or Firm*—Wei Te Chung

(57) ABSTRACT

An optical fiber connector (3) includes an insert body (31), an elastic door (33), a housing (35), an optical element (37) and a spacer (39). The elastic door includes a shutter (331) and a fixed portion (335). The elastic door is mounted between the insert body and the housing. The optical element for emitting or receiving optical signals is held by mounting the spacer to the housing. The shutter can bend inwardly in a room (351) defined by the housing after a fiber plug (4) is inserted into the room.

10 Claims, 7 Drawing Sheets

OPTICAL FIBER CONNECTOR

BACKGROUND OF THE INVENTION

1. Field of the Invention

The present invention relates to an optical fiber connector, and particularly to an optical fiber connector having an elastic door for preventing entering of dust and vapor.

2. Description of Related Art

Present day telecommunication technology utilizes, to an increasing extent, optical fibers for signal transmission. The use of optical fibers, in turn, requires numerous collateral components especially adapted to handle the light or optical transmission, among which are optical fiber connectors.

Optical fiber connectors for connecting between digital audio systems mostly use a ferrule for alignment and support of the fiber, whether it is made of glass or plastic. Examples of optical fiber connector that uses a plastic fiber within a ferrule includes: i) the F07 Duplex Plastic Fiber System from AMP; ii) the SMI (small Multi-media Interface) Connector from Sony Corporation; and iii) the HFBR series of plastic fiber connectors from Hewlett Packard. For assuring performance of the optical connector, it is necessary that a door prevents dust and vapor in the air from entering the optical fiber connectors.

For example, as shown in FIG. 1, Japanese Patent Publication No. 6-331859 discloses an optical fiber connector, which comprises a housing 1 holding an optical element 11, a rotatable door 13 assembled to the housing 1, a fiber plug 2 and a fiber 21 received in the fiber plug 2. The housing 1 defines a cavity 12 for receiving the fiber plug 2. However, the rotatable door 13 is not received within the housing 1, and is easy to be damaged. Furthermore, the rotatable door 13 is at outside of the housing 1 when the fiber plug 2 is inserted into the cavity 12, which increases the space occupied by the optical fiber connector.

Another Japanese Patent Publication No. 2000-131564 discloses a socket of an optical connector, which uses a shutter to prevent entering of dust and vapor. The shutter is connected to an inlet side of an insertion hole part by a hinge structure comprising an axial part and a spring. However, it is troublesome to assemble the axial part and the spring with the inlet side, and this consequently leads to extra cost.

SUMMARY OF THE INVENTION

An object of the present invention is to provide an improved optical fiber connector having an elastic door, which prevents dust and vapor from entering.

Another object of the present invention is to provide an optical fiber connector having an elastic door received in a housing of the optical fiber connector.

An optical fiber connector in accordance with the present invention comprises: an insert body, an elastic door, a housing, an optical element and a spacer.

The elastic door comprises a shutter and a fixed portion. An indentation is defined in the middle of the fixed portion. The shutter is an elastomer. The shutter can undergo deformation when an external force is acted on thereon, and can restore back to original state when the external force is removed.

The insert body is inserted into a room of the housing and is mounted therein. A faceplate of the insert body and a flange of the housing hold the fixed portion of the elastic door therebetween, which achieves to mount the elastic body. And a protuberance of the faceplate engages with the indentation of the elastic door, which helps to stably mount the elastic door. The elastic door cover an opening of the insert body to prevent dust and vapor to enter the room. The spacer is inserted into the housing and engages with the housing by keys of the spacer coupling with notches of the housing. The optical element is mounted in a mounting aperture of the housing by mounting the spacer to the housing.

The shutter of the elastic door is bent inwardly in the housing by external force from the fiber plug inserted into the housing, and then the fiber plug can be received within the housing.

Other objects, advantages, and novel features of the present invention will become more apparent from the following detailed description when taken in conjunction with the accompanying drawings.

DETAILED DESCRIPTION OF THE INVENTION

Figure 1:
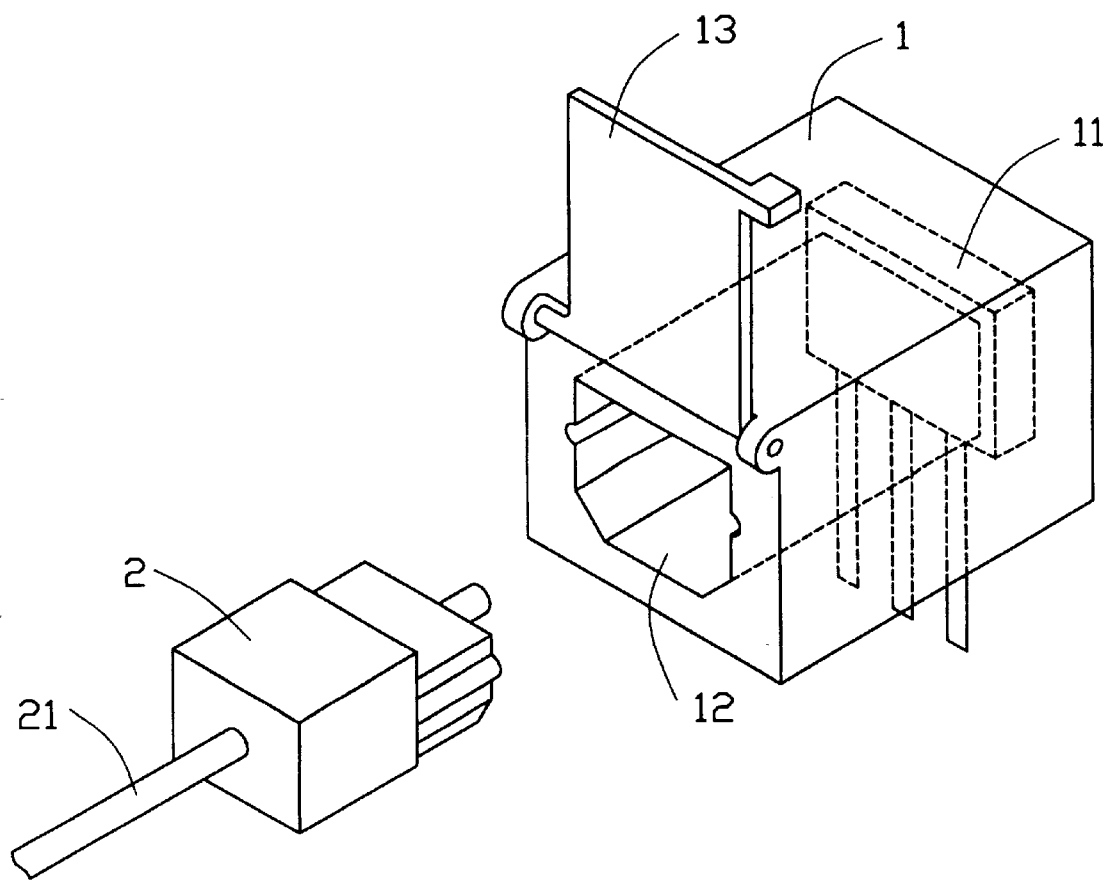
FIG. 1 shows a prior art optical connector.
Figure 2:
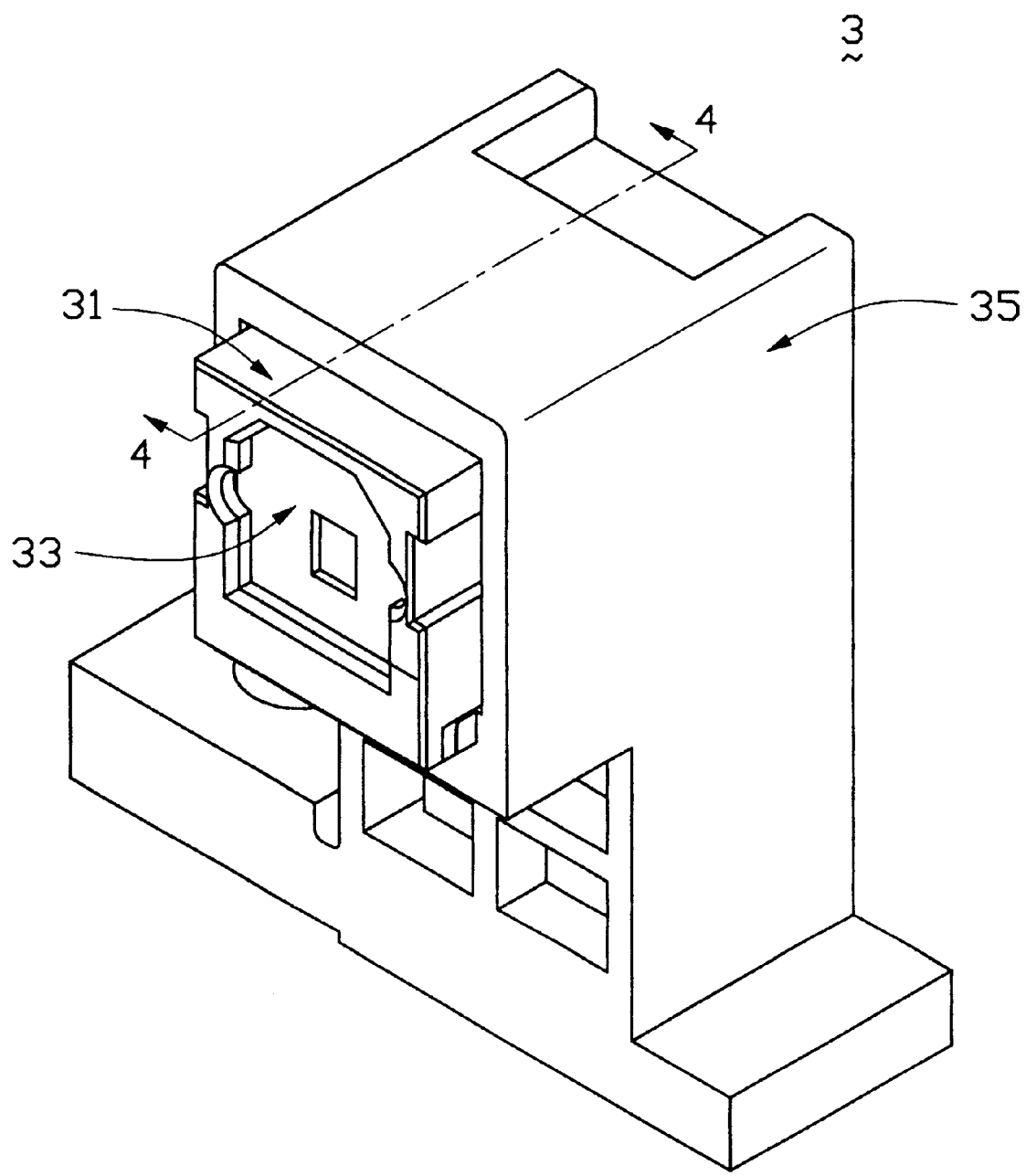
FIG. 2 is an assembled perspective view of an optical fiber connector according to the present invention.
Figure 3:
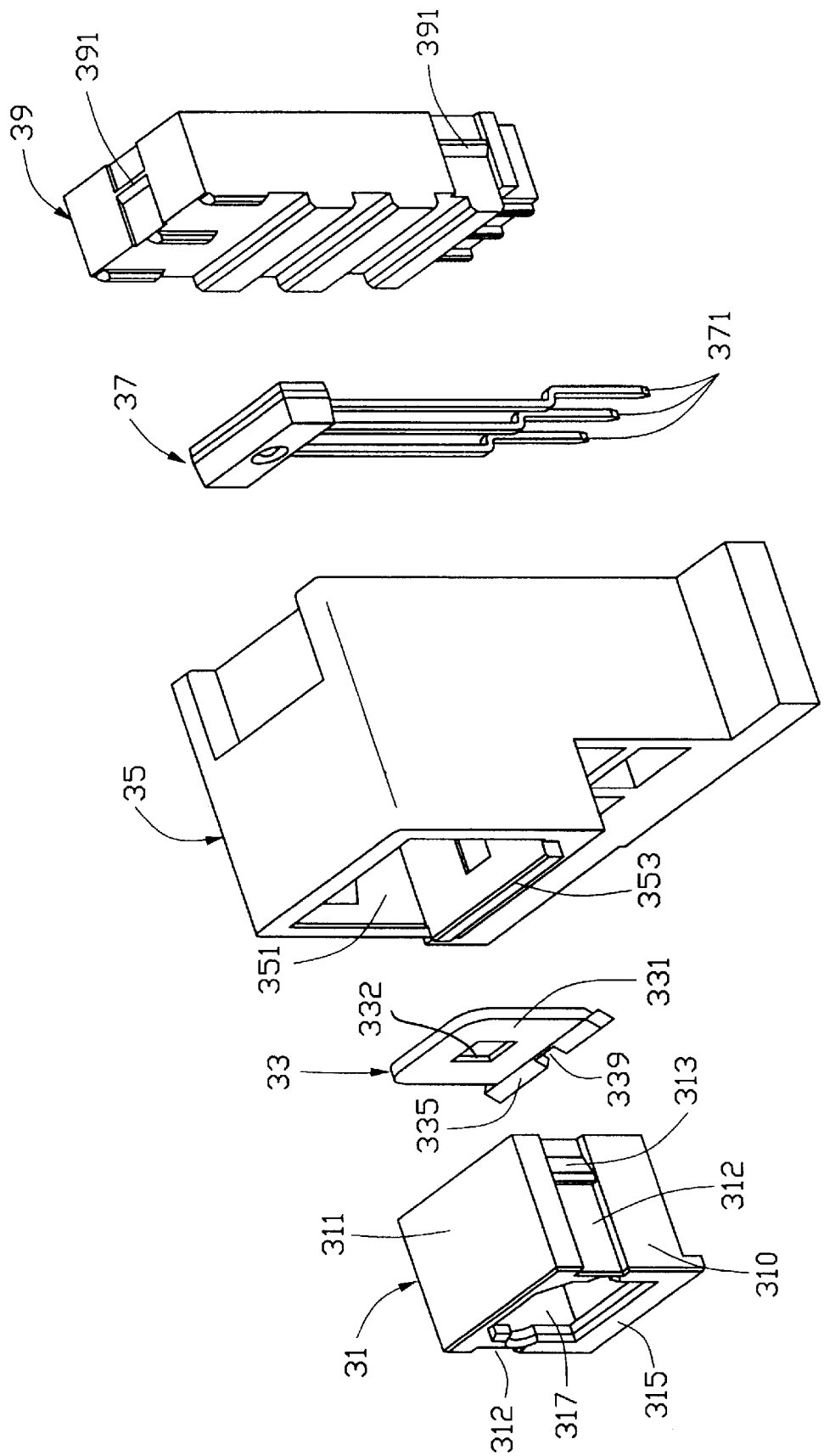
FIG. 3 is a perspective, exploded view of FIG. 2.

As shown in FIGS. 2 and 3, an optical fiber connector 3 comprises: an insert body 31, an elastic door 33, a housing 35, an optical element 37 and a spacer 39.

The insert body 31 has an open bottom and comprises a top wall 311, two opposite sidewalls 310, and a faceplate 315. An opening 317 is defined in the middle of the faceplate 315. A space (not labeled) is defined by the two sidewalls 310 and the top wall 311. A pair of grooves 312 are separately arranged in the two sidewalls 310 of the insert body 31. A pair of keys 313 respectively protrude from the grooves 312 of the insert body 31 to mate with notches (not shown) of the housing 35.

The elastic door 33 comprises a shutter 331 and a fixed portion 335. An indentation 339 is defined in the middle of the fixed portion 339. A recess 332 is formed in a front face of the door 33. The elastic door 33 is an elastomer and is made from elastic material, such as plastic or rubber. The shutter 331 can undergo deformation when an external force is acted thereon, and can restore back to original state when the external force is removed.

Figure 4:
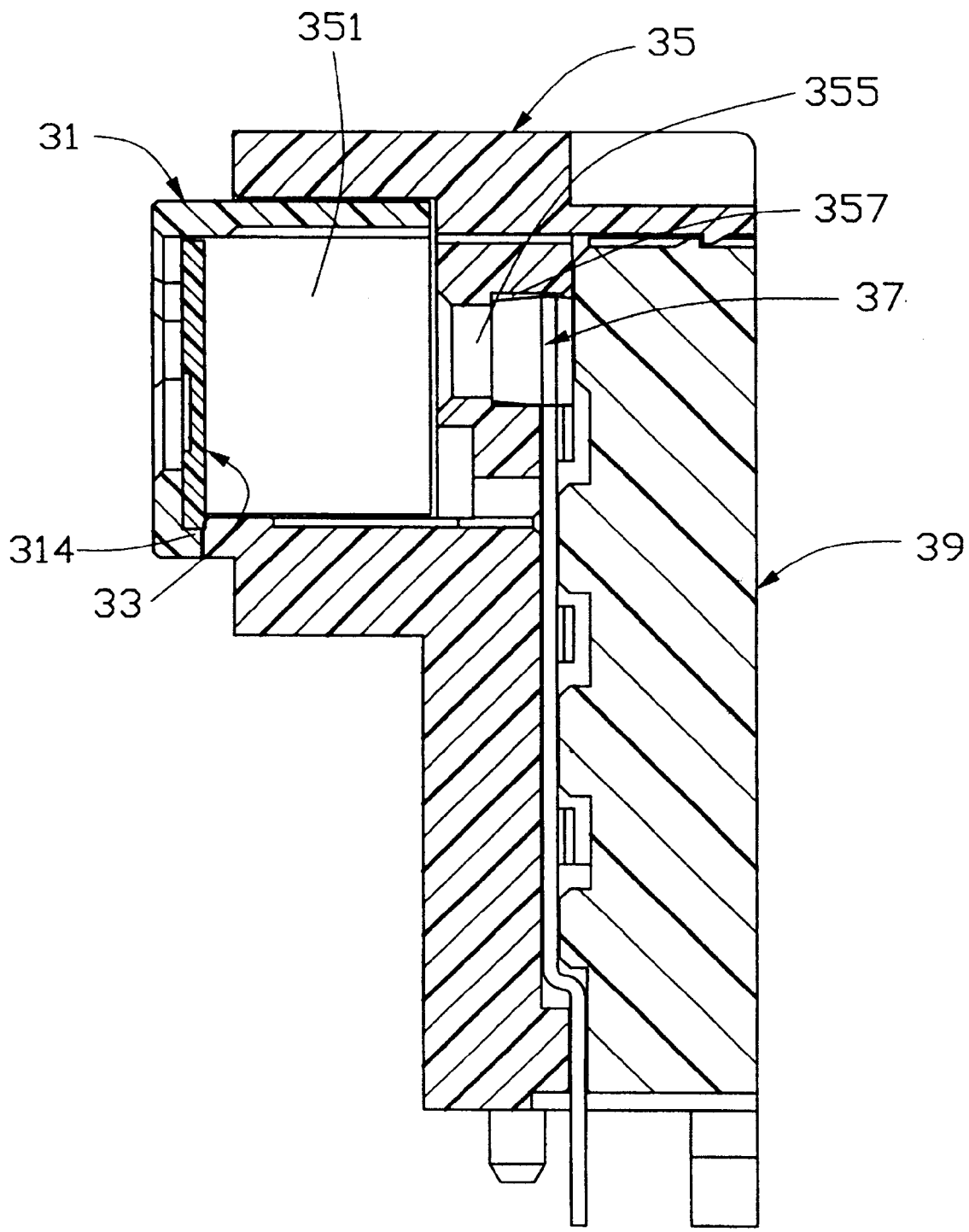
FIG. 4 is a cross-sectional view taken along line 4—4 in FIG. 2.
Figure 5:
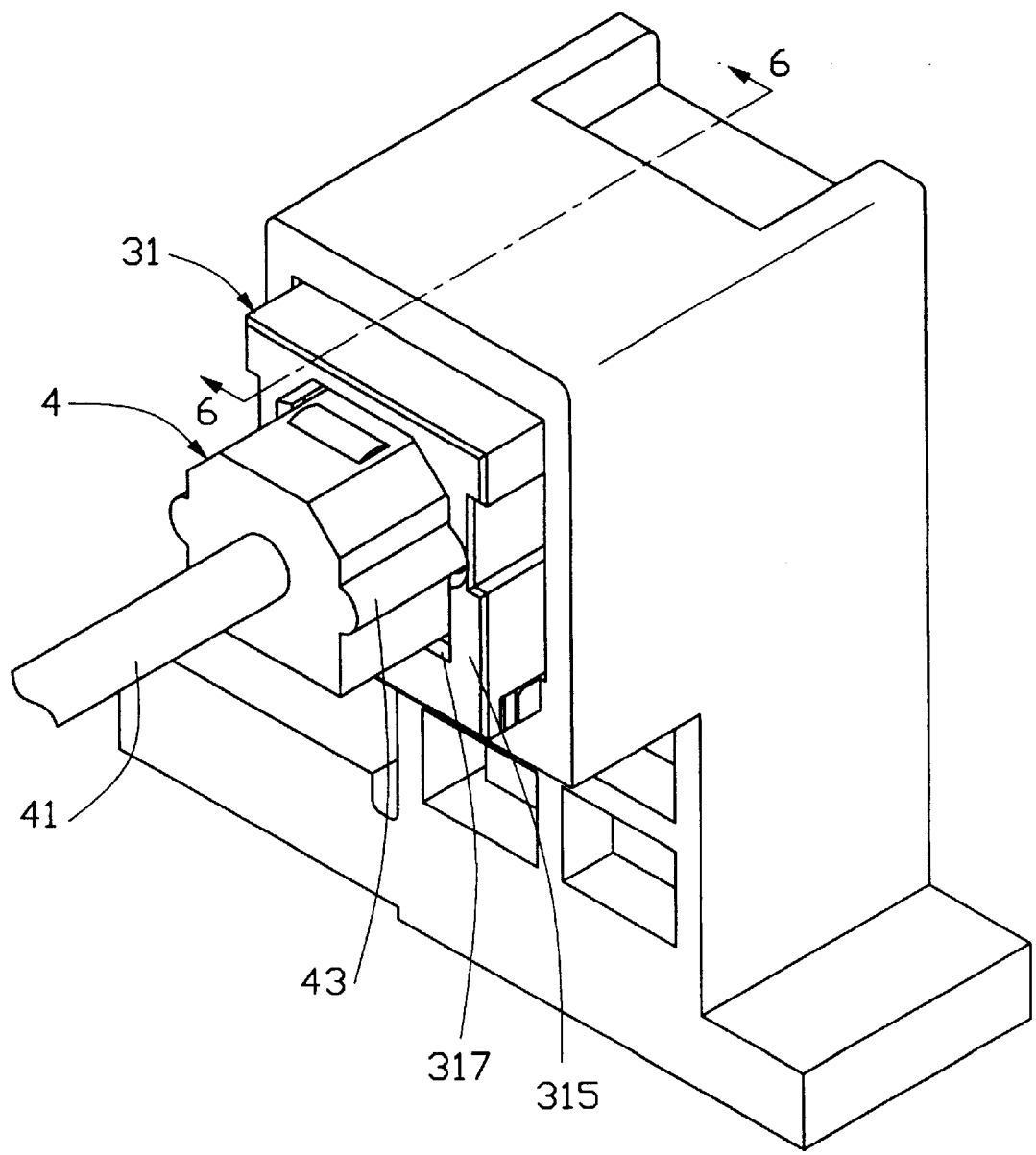
FIG. 5 is a perspective view of the optical fiber connector, with a fiber plug partly inserted therein.

Referring to FIG. 4, the housing 35 defines a room 351, an inserting aperture 355 and a mounting aperture 357. The room 351 is used to retain the insert body 31. A fiber plug 4 (as shown in FIG. 5) is made easy to align with the optical element 37 through the inserting aperture 355. The mounting aperture 357 is used to receive the optical element 37. The housing 35 further includes a front flange 353 for cooperating with the faceplate 315 to hold the fixed portion 335 in position.

The optical element 37 has a plurality of terminals 371 through which the optical element 37 connects with a printed circuit board (not shown) for emitting or receiving signals. The optical element 37 is securely received in the mounting aperture 355 by mounting the spacer 39 to the housing 35.

In assembly, the insert body 31 is inserted into the room 351 of the housing 35 and is mounted therein by engaging the keys 313 of the insert body 31 with the notches of the housing 35. The faceplate 315 and the front flange 353 hold the fixed portion 335 of the elastic door 33 therebetween. And a protuberance 314 (see FIG. 4) of the faceplate 315 engages with the indentation 339 of the elastic door 33, which helps to stably mount the elastic door 33. The elastic door 33 covers the opening 317 of the insert body 31 to prevent dust and vapor from entering the room 351. The spacer 39 is inserted into and engages with the housing 35 by the keys 391 of the spacer 39 coupling with notches (not labeled) of the housing 35.

Figure 6:
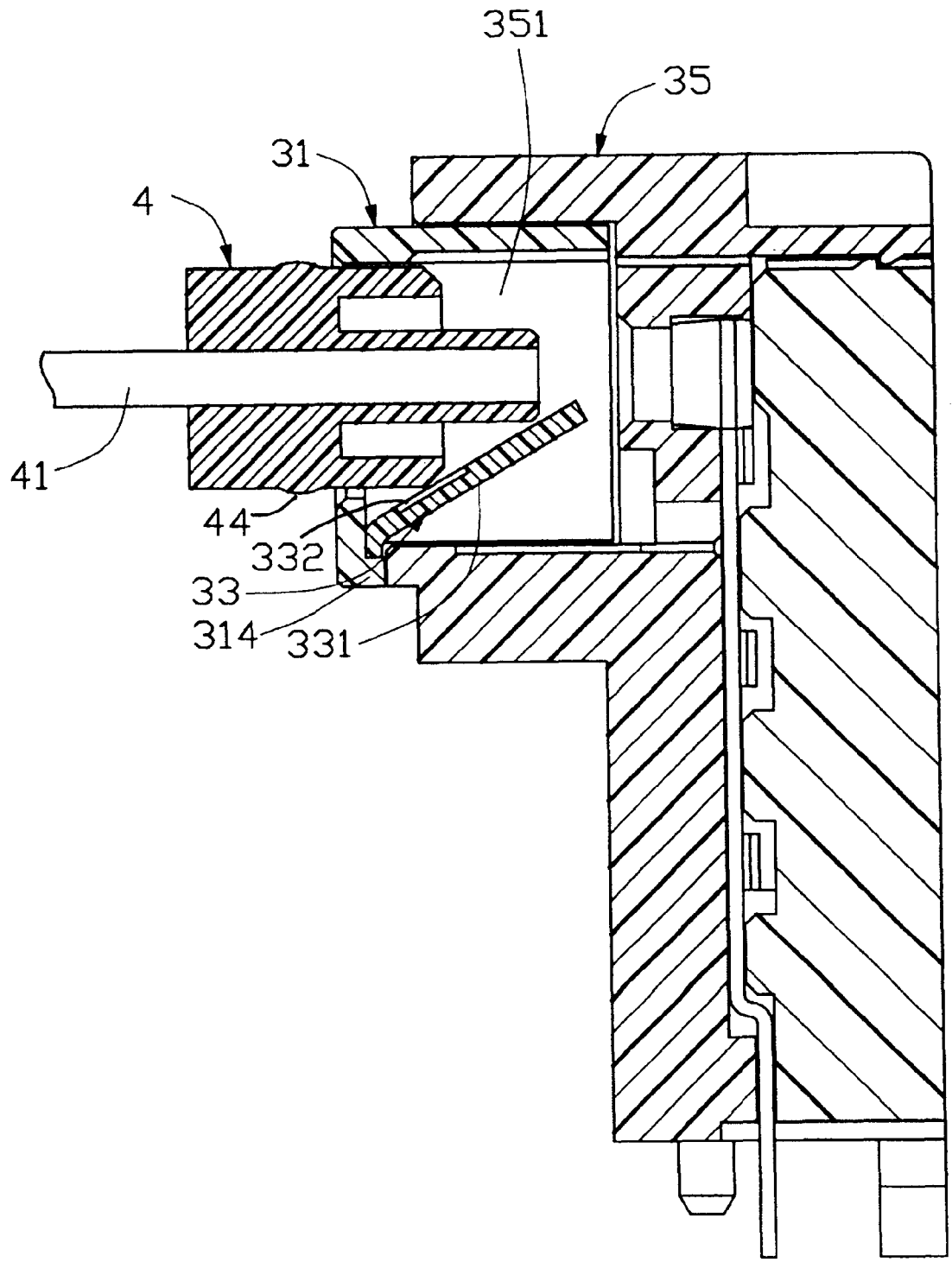
FIG. 6 is a cross-sectional view taken along line 6—6 in FIG. 5.
Figure 7:
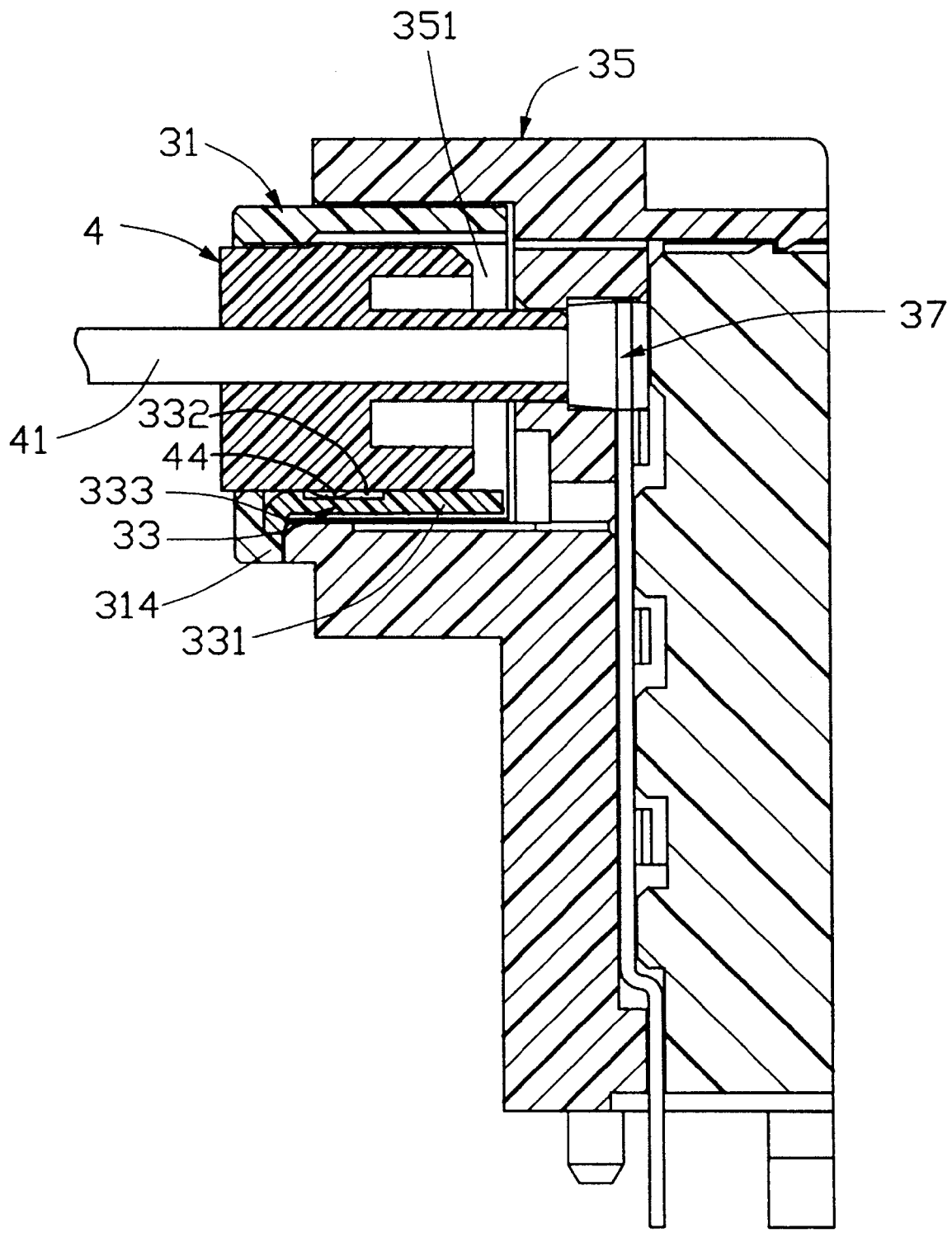
FIG. 7 is a cross-sectional view of the optical fiber connector, with the fiber plug completely inserted therein.

In use, as shown in FIGS. 5–7, the fiber plug 4 with a retention protrusion 44, contains therein a fiber 41 made of glass or plastic. The shutter 331 of the elastic door 33 is bent inwardly in the housing 35 by insertion of the fiber plug 4 into the housing 35, until the fiber plug 4 is completely inserted into the housing 35 where the shutter 331 of the elastic door 33 is bent substantially perpendicularly to the fixed portion 335 and the protrusion 44 of the plug 4 is embedded within the recess 332 of the door 33. When the plug 4 is pulled out from the housing 35, the shutter 331 of the elastic door 33 can return back to close the opening 317.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical fiber connector subassembly comprising:
   a housing defining a room;
   an insert body mating in the room of the housing; and
   a discrete door assembled between the housing and covering the room, the door being so resilient as to undergo deformation when an external force is acted thereon, and restore back to original state when the external force is removed.

2. The optical fiber connector subassembly as claimed in claim 1 wherein the housing comprises a front flange.

3. The optical fiber connector subassembly as claimed in claim 2, wherein the door includes a shutter and a fixed portion.

4. The optical fiber connector subassembly as claimed in claim 3, wherein an indentation is defined in the middle of the fixed portion.

5. The optical fiber connector subassembly as claimed in claim 4, wherein the insert body comprises a faceplate.

6. The optical fiber connector subassembly as claimed in claim 5, wherein the fixed portion is held between the front flange and the faceplate.

7. The optical fiber connector subassembly as claimed in claim 6, wherein the shutter is capable of being bent substantially perpendicular to the fixed portion when an external force is acted thereon.

8. The optical fiber connector subassembly as claimed in claim 1, wherein the door is an elastomer.

9. The optical fiber connector subassembly as claimed in claim 1, further comprising an optical element and a spacer, the optical element being securely received by mounting the spacer to the housing.

10. An optical fiber connector assembly comprising:
    an insulative housing defining therein a room with a front opening in communication with an exterior;
    an optical element disposed around the room;
    a collapsible door inherently freely vertically mounted around the front opening;
    a fiber plug inserted into said room from the front opening and forcibly deflecting said door to be in a horizontal position;
    wherein the door is sandwiched between the fiber plug and the housing with means for retaining the fiber plug with the door without inadvertent withdrawal; wherein in said means includes a retention protrusion (44) on one of said or and said fiber plug, and a recess (332) formed in the other of said door and said fiber plug.

* * * * *